United States Patent
Fernando

(10) Patent No.: US 12,255,470 B2
(45) Date of Patent: Mar. 18, 2025

(54) CHARGER FOR AEROSOL-GENERATING DEVICES

(71) Applicant: PHILIP MORRIS PRODUCTS S.A., Neuchâtel (CH)

(72) Inventor: Felix Fernando, Old Basing (GB)

(73) Assignee: Philip Morris Products S.A., Neuchâtel (CH)

( * ) Notice: Subject to any disclaimer, the term of this patent is extended or adjusted under 35 U.S.C. 154(b) by 347 days.

(21) Appl. No.: 17/882,747

(22) Filed: Aug. 8, 2022

(65) Prior Publication Data

US 2022/0369724 A1  Nov. 24, 2022

Related U.S. Application Data

(63) Continuation of application No. 16/760,634, filed as application No. PCT/IB2018/057421 on Sep. 25, 2018, now Pat. No. 11,444,465.

(30) Foreign Application Priority Data

Nov. 1, 2017  (EP) .................................. 17199598

(51) Int. Cl.
*H02J 7/00* (2006.01)
*A24F 40/60* (2020.01)
(Continued)

(52) U.S. Cl.
CPC .......... *H02J 7/00036* (2020.01); *A24F 40/60* (2020.01); *A24F 40/65* (2020.01);
(Continued)

(58) Field of Classification Search
USPC ....................................................... 320/107
See application file for complete search history.

(56) References Cited

U.S. PATENT DOCUMENTS 7,683,571 B2 *  3/2010  Takamatsu ............ H02J 7/0048
320/106
7,808,205 B2   10/2010  Rao et al.
(Continued)

FOREIGN PATENT DOCUMENTS

CN  102823048     12/2012
CN  106235414 A   12/2016
(Continued)

OTHER PUBLICATIONS

Chinese Second Office Action for CN 201880066123.1, issued by the Chinese Patent Office on Aug. 29, 2023; 15 pgs. Including English translation.
(Continued)

*Primary Examiner* — Samuel Berhanu
(74) *Attorney, Agent, or Firm* — Mueting Raasch Group

(57) ABSTRACT

A charger may be used as a social recharge hub that charges aerosol-generating devices and facilitate social connections. The charger may be able to charge a plurality of batteries concurrently or simultaneously. The charger may capable of associating a battery identifier of one or more batteries to a user. The user may also be associated with an aerosol-generating device and to a mobile user device. The charger may establish a connection with the mobile user device and communicate to the mobile user device using a communication interface. User data, such as preferences, interests, and even music, may be communicated from the mobile user device to the charger and may be used to facilitate social opportunities for the user, particularly in a public or social space with other users, or to make the space around the user more comfortable.

20 Claims, 5 Drawing Sheets

Figure 1:
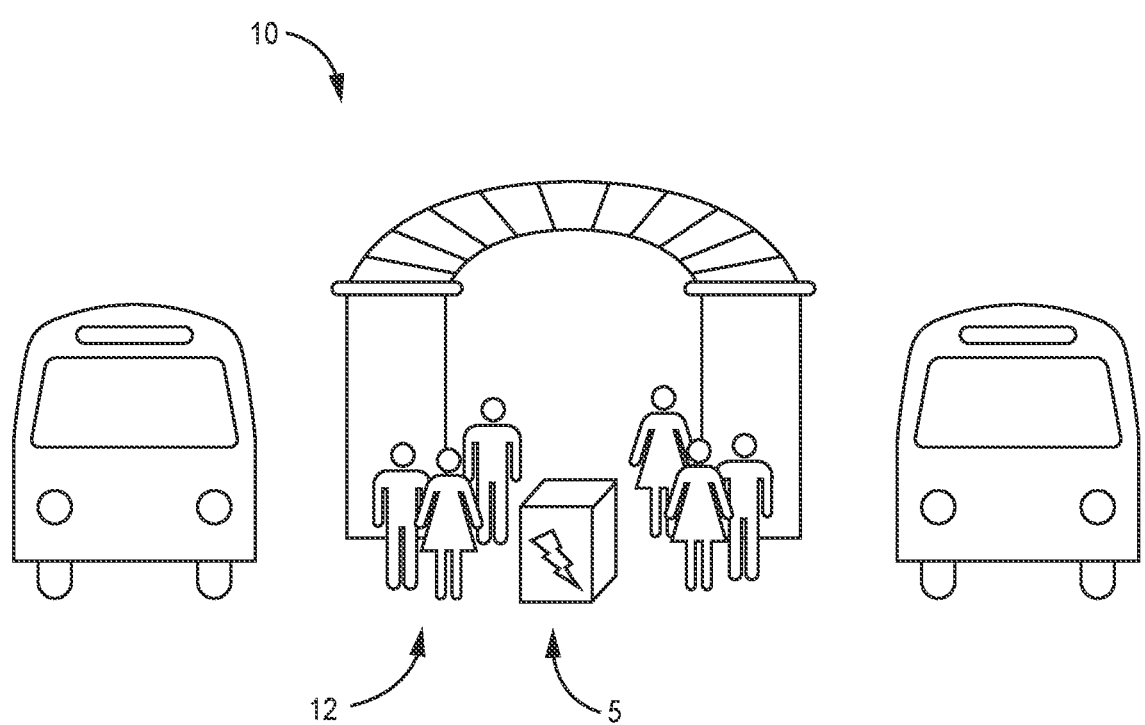

(51) Int. Cl.
*A24F 40/65* (2020.01)
*A24F 40/90* (2020.01)
*A24F 40/10* (2020.01)
*A24F 40/20* (2020.01)
*A24F 40/85* (2020.01)

(52) U.S. Cl.
CPC .......... *A24F 40/90* (2020.01); *H02J 7/00034* (2020.01); *H02J 7/00045* (2020.01); *A24F 40/10* (2020.01); *A24F 40/20* (2020.01); *A24F 40/85* (2020.01)

(56) References Cited

U.S. PATENT DOCUMENTS

| | | | |
|---|---|---|---|
| 7,888,913 | B1 | 2/2011 | Marty et al. |
| 8,022,662 | B2 | 9/2011 | Eager et al. |
| 8,432,127 | B2 | 4/2013 | Takeshita et al. |
| 9,018,899 | B2 | 4/2015 | Xiang |
| 9,566,873 | B2 | 2/2017 | Chauhdary et al. |
| 9,845,912 | B2 | 12/2017 | Phillips et al. |
| 10,448,670 | B2 | 10/2019 | Talon et al. |
| 2007/0154800 | A1 | 7/2007 | Takeshita et al. |
| 2007/0194750 | A1 | 8/2007 | Eager et al. |
| 2008/0157722 | A1 | 7/2008 | Nobutaka et al. |
| 2013/0252577 | A1 | 9/2013 | Jordan |
| 2013/0300350 | A1 | 11/2013 | Xiang |
| 2014/0107815 | A1 | 4/2014 | Lamothe |
| 2014/0312835 | A1 | 10/2014 | Katsumata |
| 2015/0128971 | A1* | 5/2015 | Verleur .................. H02J 7/00 131/329 |
| 2015/0224268 | A1* | 8/2015 | Henry .................. G06Q 50/01 128/202.21 |
| 2015/0258289 | A1 | 9/2015 | Henry, Jr. et al. |
| 2015/0305404 | A1 | 10/2015 | Rosales |
| 2016/0345628 | A1 | 12/2016 | Sabet |

FOREIGN PATENT DOCUMENTS

| | | |
|---|---|---|
| CN | 106455717 A | 2/2017 |
| DE | 102014217958 | 3/2016 |
| EP | 2875740 | 5/2016 |
| JP | H10207582 | 8/1998 |
| JP | 2000215922 | 8/2000 |
| JP | 2001309579 A | 11/2001 |
| JP | 2008141827 | 6/2008 |
| JP | 2013255415 A | 12/2013 |
| JP | 2014504142 A | 2/2014 |
| JP | 2014531186 A | 11/2014 |
| JP | 2017074559 A | 4/2017 |
| RU | 2618436 | 5/2017 |
| WO | 20130144954 | 10/2013 |
| WO | 20150052730 | 4/2015 |
| WO | 20150127429 | 8/2015 |
| WO | 20150175713 | 11/2015 |
| WO | 20160026756 | 2/2016 |

OTHER PUBLICATIONS

Japanese Office Action for JP 2022147647 issued by the Japanese Patent Office on Oct. 19, 2023;9 pgs. Including English translation.
International Preliminary Report on Patentability for PCT/IB2018/057421 issued by the International Bureau of WIPO; May 14, 2020: 12 pgs.
Russian Decision to Grant dated Feb. 10, 2022 issued by the patent Office of the Russian Federation for RU Application No. 2020114934, 23 pgs. including English translation.
European Search Report for EP Application No. 17199598.8, issued by the European Patent Office on Jul. 17, 2018; 13 pgs.
International Search Report for PCT/IB2018/057421, issued by the European Patent Office on May 16, 2019; 20 pgs.
Chinese Office Action for CN Application No. 201880066123.1 issued by the China National Intellectual Property Administration on Jan. 5, 2023; 15 pgs. Including English translation.

* cited by examiner

CHARGER FOR AEROSOL-GENERATING DEVICES

This application is a divisional application of U.S. patent Ser. No. 16/760,634, filed 30 Apr. 2020, which is the § 371 U.S. National Stage of International Application No. PCT/IB2018/057421, filed 25 Sep. 2018, which claims the benefit of European Application No. 17199598.8, filed 1 Nov. 2017, the disclosures of which are incorporated by reference herein in their entireties.

This disclosure relates to chargers, such as a social recharge hub configured to charge aerosol-generating devices and facilitate social connections.

Handheld aerosol-generating devices, such as cartomizer electronic cigarettes, are known, which utilize liquid to be evaporated or solid material (which may contain tobacco) to be heated to generate an inhalable aerosol. These devices may provide an alternative experience to conventional combustion cigarettes. Some devices may adopt a similar look and feel to conventional cigarettes, which may be familiar, easy to handle, portable, and easy to manufacture. Many aerosol-generating devices require a power source, such as a battery, to provide power an aerosolizer for generating aerosol.

Various maintenance activities may be required of some aerosol-generating devices that are unfamiliar to conventional cigarette users. For example, some aerosol-generating devices have a battery that must be recharged regularly in order to function properly. During recharging, the aerosol-generating device may be unusable. Users of conventional cigarettes may find themselves uncomfortable with the lack of engagement with the aerosol-generating device during recharging, which is not required of conventional cigarettes, particularly in public and social settings. Further, in some social settings, users in a group may wish to use their devices at the same time (for example, during a work break or while waiting for public transportation), so multiple users in the group may need to recharge their aerosol-generating devices at the same time.

In general, the present disclosure relates to a charger for an aerosol-generating device capable of charging a battery for the aerosol-generating device and capable of associating a battery identifier of the battery to a user of the aerosol-generating device. The charger may be able to charge a plurality of batteries concurrently or simultaneously. The user of the aerosol-generating device may also be the user of a mobile user device, which may establish a connection with the charger and communicate with the charger using a communication interface. User data, such as preferences, interests, and even music, may be communicated from the mobile user device to the charger and may be used to facilitate social opportunities for the user, particularly in a public or social space with other users, or to make the space around the user more comfortable.

Various aspects of the present disclosure relate to a charger for an aerosol-generating device. The charger includes a charging interface operatively couplable to a battery for the aerosol-generating device. The charger also includes a communication interface to communicate with a mobile user device at least while the battery is coupled to the charging interface. The mobile user device is separate from the battery. The charger further includes a controller operatively coupled to the charging interface and the communication interface. The controller is configured to determine a unique battery identifier corresponding to the battery to allow the controller to distinguish one battery from other batteries coupled to the charging interface. The controller is also configured to establish a connection with the mobile user device using the communication interface. The connection is configured to communicate user data. The controller is further configured to associate the battery identifier with the mobile user device in response to the determination of the battery identifier and the established connection with the mobile user device.

Various aspects of the present disclosure relate to a charger for an aerosol-generating device. The charger includes a charging interface operatively couplable to a battery for the aerosol-generating device and at least one other battery for aerosol-generating devices of other users. The charger also includes a communication interface to communicate with a mobile user device at least while the battery is coupled to the charging interface. The charger further includes a controller operatively coupled to the charging interface and the communication interface. The controller is configured to establish a connection with the mobile user device using the communication interface at least when the battery is coupled to the charging interface. The connection is configured to communicate user data. The controller is also configured to receive user data from the mobile user device using the connection. The controller is further configured to provide social data based on the user data to one or both of the charging interface and the communication interface to share with other users having batteries coupled to the charging interface.

Various aspects of the present disclosure relate to a charger for an aerosol-generating device. The charger includes a charging interface operatively couplable to a battery for the aerosol-generating device. The charger also includes an air sensor configured to detect a contaminant. The charger further includes a controller operatively coupled to the charging interface and the air sensor. The controller is configured to detect the contaminant using the air sensor. The controller is also configured to activate an air mover in response to detection of the contaminant.

Various aspects of the present disclosure relate to a charger for an aerosol-generating device. The charger includes a charging interface operatively couplable to a battery for the aerosol-generating device. The charger also includes a cleaning port to receive at least a portion of the aerosol-generating device for cleaning, the cleaning port having an activatable cleaning element to clean the aerosol-generating device when at least the portion is received in the cleaning port. The charger further includes a controller operatively coupled to the charging interface and the cleaning element. The controller is configured to activate the cleaning element to clean the aerosol-generating device. The controller is also configured to establish a connection with a mobile user device.

In one or more aspects, the controller is operatively coupled to a communication interface to communicate with a mobile user device at least while the battery is coupled to the charging interface. The controller is configured to establish a connection with the mobile user device using the communication interface. The connection is configured to communicate user data. The controller is also configured to associate a battery identifier with the mobile user device after establishing the connection with the mobile user device.

In one or more aspects, the user data includes one or more of: a username associated with the mobile user device, a mobile user device identifier, a maximum battery charging time, one or more battery identifiers associated with the mobile user device, cleaning data, calendar data, travel data, multimedia data, user preference data, and social data.

In one or more aspects, the controller is further configured to establish the connection using a Bluetooth protocol.

In one or more aspects, the controller is further configured to associate the battery identifier with the mobile user device based on user data communicated between the communication interface and the mobile user device.

In one or more aspects, the controller is further configured to receive the battery identifier using the charging interface in response to coupling the battery to the charging interface.

In one or more aspects, the controller is configured to send the battery identifier to the mobile user device using the communication interface. The controller is also configured to receive a determination from the mobile user device that the battery identifier matches the mobile user device after sending the battery identifier to the mobile user device.

In one or more aspects, the controller is further configured to send the battery identifier to any mobile user device connected to the controller to associate the battery with a particular mobile user device.

In one or more aspects, the controller is configured to receive one or more battery identifiers associated with the mobile user device from the mobile user device. The controller is also configured to determine whether the battery identifier matches one of the received one or more battery identifiers.

In one or more aspects, the controller is further configured to disconnect from the mobile user device in response to the determination that the battery identifier does not match.

In one or more aspects, the controller is further configured to search for another mobile user device in response to a determination that the battery identifier does not match.

In one or more aspects, the controller is further configured to disconnect from the mobile user device in response to the battery being uncoupled from the charging interface.

In one or more aspects, the controller is configured to detect user action associated with the battery. The controller is also configured to send the battery identifier to the mobile user device using the communication interface in response to detection of the user action.

In one or more aspects, the charging interface includes a screen and the controller is further configured to generate a viewable element based on user data from the mobile user device and display the viewable element on the screen.

In one or more aspects, the controller is further configured to modulate a battery charging current based on the maximum battery charging time received from the mobile user device.

In one or more aspects, the maximum battery charging time is determined in response to one or more of calendar data, travel data, and user preference data.

In one or more aspects, the controller is configured to store an association of the battery and the mobile user device. The controller is also configured to search for the mobile user device using the communication interface in response to the battery being recoupled to the charging interface.

In one or more aspects, the controller is further configured to send charger data to the mobile user device using the communication interface. The charger data includes one or more of: a level of charge of the battery, a time before full charge of the battery, a warning that full charge of the battery is completed, a warning that the battery remains operatively coupled to the charging interface in response to the user having an upcoming event, a time since last cleaning of the aerosol-generating device at this charger, a geographic location of the charger, and a service suggestion.

In one or more aspects, the controller is further configured to charge the battery according to one or more of: a quick charge mode and a load balancing mode.

In one or more aspects, the controller is operatively couplable to a wireless network to send a message to the mobile user device related to charging the battery.

In one or more aspects, the controller is further configured to determine social data based on the user data from the mobile user device. The controller is also configured to share the social data with other mobile user devices having an established connection using the communication interface.

In one or more aspects, the charger includes a housing having the charging interface. The housing further includes a locking component assignable to one or more users.

In one or more aspects, the charging interface allows a user to lock the battery to the charging interface to prevent others from taking the battery.

Advantageously, utilizing the charger may turn the problem of multiple users needing to charge their aerosol-generating devices into an opportunity for social exchange. The charger may also provide a personalized recharging experience that may consider the calendar and travel schedule of the user, as well as entertainment preferences of the user. Further, the charger may facilitate social opportunities with other users of the charger by sharing social information with the other users. Further still, the charger may provide a convenient cleaning of one or more parts of the aerosol-generating device that may be used in conjunction with battery charging. Additionally, the charger may facilitate a more comfortable ambient environment for users proximate to the charger by communicating with one or more environmental controls remote to the charger. Other benefits will become apparent to one skilled in the art having the benefit of this disclosure. The present disclosure describes herein the charger in more detail.

All scientific and technical terms used herein have meanings commonly used in the art unless otherwise specified. The definitions provided herein are to facilitate understanding of certain terms used frequently herein.

The term "aerosol-generating device" refers to a device configured to use an aerosol-generating substrate to generate aerosol. Preferably, the aerosol-generating device also includes an aerosolizer, such as an atomizer, cartomizer, or heater.

The term "aerosol-generating substrate" refers to a device or substrate that releases, upon heating, volatile compounds that may form an aerosol to be inhaled by a user. Suitable aerosol-generating substrates may include plant-based material. For example, the aerosol-generating substrate may include tobacco or a tobacco-containing material containing volatile tobacco flavor compounds, which are released from the aerosol-generating substrate upon heating. In addition, or alternatively, an aerosol-generating substrate may include a non-tobacco containing material. The aerosol-generating substrate may include homogenized plant-based material. The aerosol-generating substrate may include at least one aerosol former. The aerosol-generating substrate may include other additives and ingredients such as flavorants. Preferably, the aerosol-generating substrate is a liquid at room temperature. For example, the aerosol forming substrate may be a liquid solution, suspension, dispersion or the like. Preferably, the aerosol-generating substrate may include glycerol, propylene glycol, water, nicotine and, optionally, one or more flavorants. Preferably, the aerosol-generating substrate includes nicotine.

The term "tobacco material" refers to a material or substance including tobacco, which includes tobacco blends or flavored tobacco, for example.

The term "cartomizer" refers to a combination of cartridge and atomizer that is part of an electronic cigarette.

The present disclosure provides a charger for aerosol-generating devices. The charger may be described as a social recharge hub configured to charge a plurality of aerosol-generating devices and facilitate social connections between users of the aerosol-generating devices.

The aerosol-generating device may use or include an aerosol-generating substrate. The aerosol-generating substrate may be formed of or be contained in a cartridge or heat stick, which may be coupled to a housing of the aerosol-generating device.

An aerosolizer may be operatively coupled to the aerosol-generating substrate to generate aerosol when activated. In particular, the aerosolizer may be thermally coupled to the aerosol-generating substrate. The aerosolizer may also be coupled to the housing of the aerosol-generating device. The aerosolizer may be at least partially or entirely disposed in a mouth portion of the aerosol-generating device. The aerosolizer may be at least partially disposed in a controller portion.

The aerosolizer may utilize any suitable technique for generating aerosol from the aerosol-generating substrate. The aerosolizer may use heat to generate aerosol and include one or more heating components, such as a heating blade, a heater, or an induction coil and susceptor (utilizing induction heating). The susceptor may be any suitable structure capable of being heated by induction, such as a mesh heater. Additionally, or alternatively, the aerosolizer may include a vibrating element, which may not need heat to generate aerosol. The heating blade may be useful for inserting into a solid substrate and being heated to produce aerosol. The heater may include a heating element disposed adjacent to a liquid substrate that is heated to produce aerosol. A heater may be a mesh heater. The mesh heater may allow liquid substrate stored in the storage compartment to pass through interstices in the mesh heater from one surface of the mesh to an opposite surface of the mesh.

The aerosol-generating substrate may be contained in a substrate housing. The substrate may be described as, or as a content of, a heat stick. The aerosolizer may be coupled to the consumable device to aerosolize the heat stick or the heat stick contents. The heat provided by the heating blade to the heat stick may not burn the smoking material. The smoking material may include tobacco.

The aerosolizer may include a heater, a heater coil, a chemical heat source such as a carbon heat source, or any suitable means that heats a liquid substrate to generate aerosol from a liquid substrate. The aerosolizer may receive electrical energy or power to release or generate aerosol from the liquid substrate. The aerosolizer may be a heater that varies in temperature depending on the electrical energy received. For example, the heater may rise in temperature in response to a higher voltage received. The aerosolizer may be disposed adjacent to the aerosol-generating substrate. For example, the aerosolizer may be coupled adjacent to the liquid substrate.

The aerosolizer may be compatible for use with an aerosol-generating substrate having a nicotine source and a lactic acid source. The nicotine source may include a sorption element, such as a PTFE wick with nicotine adsorbed thereon, which may be inserted into a chamber forming a first compartment. The lactic acid source may include a sorption element, such as a PTFE wick, with lactic acid adsorbed thereon, which may be inserted into a chamber forming a second compartment. The aerosolizer may include a heater to heat both the nicotine source and the lactic acid source. Then, the nicotine vapor may react with the lactic acid vapor in the gas phase to form an aerosol.

The aerosolizer may be compatible for use with an aerosol-generating substrate having a capsule that contains nicotine particles and disposed in a cavity. During a user's inhalation, the air flow may rotate the capsule. The rotation may suspend and aerosolize the nicotine particles.

The aerosol-generating device may include an actuator. The actuator may include a button or other type of switch. The actuator may be engaged in response to being pressed, toggled, or otherwise manipulated by the user. The engagement of the actuator may initiate various functionality of the aerosol-generating substrate. The aerosolizer may be activated in response to engagement of the actuator.

The actuator may be coupled to the housing of the aerosol-generating device. For example, the actuator may be disposed in or on the housing of the aerosol-generating device to be accessible by the user. In particular, the actuator may be disposed on the control portion of the aerosol-generating device. The actuator may be associated with one or more functions. The actuator may be used to power on (for example, activate) and power off (for example, deactivate) the aerosolizer or other components of the aerosol-generating device. The actuator may utilize any suitable mechanism to receive input from the user, such as a mechanical button that may be pressed by the user.

In addition, or as an alternative, to the actuator, a puff sensor may be operatively coupled to the aerosolizer to activate the aerosolizer. A puff sensor may be operatively coupled to a controller of the aerosol-generating device. A puff sensor may detect an inhalation by the user on the mouth portion of the aerosol-generating device. The puff sensor may be positioned within an airflow channel in the aerosol-generating device to detect when a user inhales, or puffs, on the device. The puff may be detected by the controller using the puff sensor. Non-limiting types of puff sensors may include one or more of a vibrating membrane, a piezoelectric sensor, a mesh-like membrane, a pressure sensor (for example, a capacitive pressure sensor), or an airflow switch.

A power source may be used to provide power to the aerosolizer or other components of the aerosol-generating device. The power source may be operatively coupled to at least the aerosolizer. The power source may also be operatively coupled to the display or the control circuit. The power source may be disposed in the controller portion of the aerosol-generating device. The power source may be a battery. The aerosol-generating device may accept disposable or rechargeable batteries. The power source may include a charging interface configured to operatively couple to an external power source to charge the battery.

The battery may include a battery identifier, such as a serial number, which may be used to identify the battery. The battery identifier may be stored in a memory of the battery and may be accessible through a connection on the battery, such as the battery terminals. The battery identifier may be retrieved through the battery terminals even when the battery is being charged, or before or after charging. Preferably, the battery identifier may be received by the charger before charging or early during the charging process.

Additionally, or alternatively, the battery identifier may visible to a user of the battery. For example, the battery identifier may be printed on a label attached to a surface of the battery, which the user may read. The battery identifier may be printed as a code, such as a barcode or QR code, which may be read by any suitable barcode reader. The charger may receive the battery identifier in response to user input, for example, input into a mobile user device operably coupled to the charger or even input into the charger itself when a user interface is provided.

The charger may be located in any suitable or convenient area for one or more users of aerosol-generating devices to access and recharge their batteries. For example, the user may enjoy use of the aerosol-generating device one or more times while the user is out in public, such as during the workday or when traveling. The battery may need to be recharged in those public and social spaces, which may include a location in or near the office or a transit centre for airplanes, trains, or buses. The charger may be a permanent fixture in an area or may be a portable charger.

The charger may be capable of recharging one or more batteries. Preferably, a plurality of batteries may be charged concurrently (for example, at the same time or simultaneously). Each battery may correspond to a different user or aerosol-generating device. The charger may include a charging interface that is operably couplable to one or more batteries. The charging interface may be configured to work with multiple different batteries. In particular, the charger may include one or more charging ports each capable of receiving a battery for charging.

A power supply may allow the charger to be plugged into an electrical outlet to provide electrical power to the charger. The charger may also include a battery to allow for portable charging of the aerosol-generating device battery.

The charger may include a graphical user interface, such as one or more light-emitting diodes (LED) or display screens. Various information, such as identifiers, names, messages, warnings, alerts, and the like may be provided by the graphical user interface to one or more users in the vicinity of the charger. The graphical user interface may also include user input capability, such as an actuator or a touchscreen. The graphical user interface may be used to indicate a charging status of the battery being charged by the charger. For example, using an LED disposed proximate or adjacent to the battery being charged. The graphical user interface may be used to facilitate social functionality (for example, social games). For example, one or more LEDs proximate or adjacent to the battery may be modulated, such as lighting up or blinking simultaneously to indicate an interest of the user or a match of shared interests among multiple users. As another example, the screen may show a visual element that indicates users who have the same interests using a message on the screen.

The graphical user interface may include one or more display screens. The graphical user interface may include a specific screen associated with one or more of the charging ports. For example, each charging port may have a different associated specific screen. Information about the user may be displayed on the specific screen based on user data, for example, the name of the user or a particular preference or interest.

The graphical user interface may include a general, or primary, screen associated with a plurality of the charging ports (for example, some or all). The general screen may be disposed centrally on the charger and visible to multiple users. Global messages may be shown on the general screen, which may be used to increase socialization among the users. For example, the charger may include one or more speakers, which may be used to provide information or entertainment to the users, such as music. The general screen may display the name of the music currently being played on the speaker of the charger, which may be transmitting from one of the connected mobile user devices to the charger.

The charger may allow a user to lock an aerosol-generating device that is coupled to the charger, for example, coupled to the charging interface or the cleaning interface. For example, the charger may allow the user to lock the battery coupled to the charging interface. When locked, the battery may not be readily removable from the charging interface. The locking of the battery may mitigate the user accidentally taking a wrong battery out of the charger (for example, a battery belonging to another user). The user may unlock the battery with a user input. The user may provide input to lock or unlock the battery using a mobile user device, such as a smartphone or tablet, accessible by the user.

The charging interface may include one or more actuators, such as a button, which may be in addition to or an alternative to a touchscreen on the charging interface. For example, at least one actuator may be associated with one of the batteries coupled to the charging interface. A user action, such as pressing the button, may be received as user input. The user input may be used for various functionality of the charger. For example, pressing the button may command the charger to send the battery identifier of the battery associated with the button to the mobile user device.

The charger may include a speaker to provide further interaction for the user. For example, music may be provided from the mobile user device to the charger for playback over the speaker. The speaker may also be used for informational purposes to alert the user, for example, with messages relating to charging status or schedule.

A cleaning port may be provided that is accessible to one or more users. One or more components of the aerosol-generating device may need to be cleaned occasionally, such as the heating blade. The cleaning port may include an activatable cleaning element, which may be used to clean the one or more components of the aerosol-generating device before, during, or after charging the battery. A non-limiting example of an activatable cleaning element is a rotating brush at least partially disposed in the cleaning port.

The charger may include a housing that maintains or at least partially contains one or more of the components of the charger. One or more of the power supply, the graphical user interface, the charging interface, the speaker, and the cleaning port may be coupled to the housing and at least partially disposed in or on the housing. One or more of the graphical user interface, the charging interface including one or more charging ports, and one or more cleaning ports may form at least part of an outer surface of the housing. For example, the charging ports and the cleaning ports may be disposed in the housing or formed therein to create receptacles for receiving components of the aerosol-generating device.

The charger and the housing may be modular. In other words, the charger may include one or more modules, or a plurality of modules, to carry out various functionality. For example, the housing of the charger may include one or more removably couplable portions. Each of the modules, or each of the removably couplable portions, may be coupled to form a stack. One module may include the charging interface. Another module may provide a power supply for the charger, which may include a battery or a connection to an external power source (for example, an electrical outlet). Yet another module may provide the air quality sensor and may be operatively couplable to an air mover to control the air mover (for example, using a wired or wireless connection). A further module may include the cleaning port, which may include, for example, a rotating brush to clean a heating blade. In this manner, the functionality of the charger may be conveniently customised to the requirements of a particular location.

One or more locking components may be operably coupled to the charger. For example, a locking component may be a lockable compartment (for example, a drawer or locker) or an attachable component (for example, a locking wire coupled to the aerosol-generating device). The charger may assign one or more users, who may be identified with user data or the battery identifier, to each locking component. The locking component may be coupled to the housing of the charger. The locking component may be remote to the housing but controllable by the charger. The locking component may be used for securing or storing various aerosol-generating substrates or any other items, such as sensorial media or other aerosol-generating accessories. In addition, or as an alternative, to traditional mechanical locks, the locking component may use an electronically-controllable lock that locks and unlocks in response to the presence of the user or in response to user input. For example, when the user couples a battery to the charger that is identified with the same user, the locking component assigned to the user may unlock because the user is present. When the user removes the battery from the charger, the locking component may lock. As another example, the user may provide user input to the graphical user interface or the mobile user device in communication with the charger that identifies the user, which may command the associated locking component to lock or unlock.

The locking and unlocking features related to the locking component may be the same as, or different from, the features of the battery lock, and vice versa.

The charger may provide a communication interface that may be used to communicate with one or more other devices, such as the mobile user device. The communication interface may be configured to communicate with one or more mobile user devices. In particular, the communication interface may communicate with the mobile user device at least while the battery associated with the same user is coupled to the charging interface. The mobile user device may also be used to manage various functionality of the charger (for example, charging, cleaning, air quality, etc.).

The communication interface may use any suitable technique to communicate with other devices. The communication interface may utilize wireless communication. A non-limiting example of wireless communication includes using a Bluetooth connection, such as Bluetooth Low Energy (BLE). Additionally, or alternatively, the communication interface may utilize wired communication, such as a universal serial bus (USB) or power-line communication. Further, the charger may be capable of charging one or more mobile devices through the communication interface (or through another interface), for example, using a USB connection.

A sensor, such as an air sensor for air quality, may be provided by the charger. An air sensor may be used to detect a contaminant in the vicinity of the charger. The air sensor may be on the charger or disposed remote to the charger (for example, operably coupled by a wired or wireless connection). Non-limiting examples of contaminants detectable by the air sensor include: volatile organic compounds (VOCs), carbon dioxide ($CO_2$), etc. Once a contaminant is detected, an alert may be sent to the mobile user device that the air quality is low.

The charger may include a controller that may be operably coupled to one or more other components of the charger to carry out various functionality described herein. The controller may include a memory or memory unit to store one or more instructions that may be executed by a processor or processing unit of the controller.

The controller may be operatively coupled to the charging interface and the communication interface. The controller may receive the battery identifier, for example, using the charging interface. In response to coupling the battery to the charging interface, the controller may be able to access to the battery identifier.

The controller may determine the battery identifier corresponding to the battery coupled to the charging interface, for example, using of the charging ports. The controller may be connected to multiple charging ports. In response to the battery being coupled to the charging interface, the controller may be able to determine the corresponding battery identifier.

The controller may establish a connection with the mobile user device using the communication interface, for example, at least when the battery is coupled to the charging interface. The controller may be triggered by, or may be capable of detecting, the coupling of the battery to the charging interface and then may initiate a connection to the mobile user device. The charger may be able to establish the connection to the mobile user device before the battery is coupled to the charging interface. For example, a user may engage an actuator or touchscreen element associated with a particular charging port to establish the connection to the mobile user device, and then the battery may be coupled to said charging port. The connection may be used to communicate user data, for example, from the mobile user device to the charger, or vice versa. Other types of data may be communicated over the connection, too.

The controller may send the battery identifier to the mobile user device using the communication interface. For example, the mobile user device may not have stored the battery identifier associated with the battery for the aerosol-generating device. In response to detection of the user action (for example, user engagement of the actuator corresponding to one of the charging ports), the battery identifier received by the controller using the charging interface may be communicated over the connection to the mobile user device. The mobile user device may then store the battery identifier.

The controller may also receive a determination from the mobile user device that the battery identifier matches the mobile user device. The mobile user device may have stored one or more battery identifiers associated with the battery or batteries for the aerosol-generating device. The battery identifier may be sent from the charger to the mobile user device after the battery is coupled to the charging interface. The mobile user device may determine that the received battery identifier matches one of the stored battery identifiers. The mobile user device may send the determination to the charger that the battery identifier of the battery coupled to the charging interface matches, or is associated with, the user of the mobile device.

The controller may receive one or more battery identifiers from the mobile user device. One or more battery identifiers may be stored on the mobile user device, which may be associated with the mobile user device (for example, previously identified as associated to the user of the mobile user device), and may be sent from the mobile user device to the charger. The controller may receive the one or more battery identifiers for comparison with the battery identifier received using the charging interface after the battery has been coupled to the charging interface. In response to the battery identifier from the coupled battery matching the one of the battery identifiers received from the mobile user device, the controller may determine that the battery identifier is associated with the mobile user device.

The controller may associate the battery identifier with the mobile user device in response to the determination of the battery identifier and the established connection with the mobile user device (for example, sending or receiving one or more battery identifiers for comparison). Additionally, or alternatively, the battery identifier may be associated with the mobile user device based on user data communicated between the communication interface and the mobile user device. For example, the user may interact with the mobile user device to indicate that the battery coupled to the charging interface may be associated with the particular mobile user device after establishing the connection.

The controller may receive user data from the mobile user device using the connection. User data may include any data associated with the user of the mobile user device. Non-limiting examples of user data include: a username associated with the mobile user device, a mobile user device identifier, a maximum battery charging time, one or more battery identifiers associated with the mobile user device, cleaning data (for example, a time since last cleaning of the aerosol-generating device), calendar data (for example, appointments), travel data (for example, a travel schedule or past trip history), multimedia data (for example, music or other files), user preference data (for example, air quality preferences, room lighting, or entertainment preferences, such as a type of music or movie), or social data (for example, hobbies, interests, or favourite music). Non-limiting examples of a mobile user device identifier include: International Mobile Equipment Identity (IMEI), Mobile Equipment Identifier (MEID), Electronic Serial Number (ESN), or International Mobile Subscriber Identity (IMSI).

The controller may be capable of providing social data based on user data, which may be received from the mobile user device. For example, the controller may show on the graphical user interface the number of users that enjoy a particular type of music based on data from the mobile user devices connected that indicate enjoyment of the particular type of music. The controller may share social data of a connected mobile user device with other connected mobile user devices using the communication interface.

The controller may also be coupled to the air sensor to detect one or more contaminants near the charger. The controller may further be operably coupled to an air mover. The air mover may be part of the charger or may be disposed remote from the charger (for example, coupled by a wired or wireless connection). The air mover may be disposed proximate to, adjacent to, or in a space or room shared with the charger. Non-limiting examples of an air mover include: a motorized fan, an air conditioning unit, or a space heating unit. Non-limiting examples of wireless connections include: Wi-Fi or a "smart switch" connection.

The air mover may blow air, disperse air, or extract contaminants from the air. The air mover may be described as an air cleaner, ventilator, or air circulator. For example, the air mover may include a replaceable activated carbon filter for filtering odours from an enclosed space shared with the charger (which may be used in a contaminant extractor mode). The air mover may also include an air freshening substrate, which may be positioned to release air freshener into the air stream of the air mover, manually or automatically on a regular basis.

The controller may activate or turn on the air mover (for example, automatically) in response to detection of the contaminant automatically or provide a suggestion to the user. Upon receiving user preference data, for example, from the mobile user device or by user input, the controller may adjust the activation of the air mover. Once the air mover is activated by the controller, the fan may be deactivated or turned off, for example, after a predetermined amount of time or in response to the air sensor reading dropping below a predetermined threshold (for example, a threshold concentration) or overall threshold air quality.

The mobile user device may be operably coupled to the air mover, for example, to activate or deactivate the air mover in response to user input or to change the mode of the air mover (for example, between a fan mode or a contaminant extractor mode). The air mover may be operably coupled to the mobile user device using the communication interface of the charger. The mobile user device may receive an alert of low air quality, and the user may respond with user input to the mobile user device, the charger, or an actuator operably coupled to an air mover. When multiple mobile user devices are connected to controller, any user may be allowed to control the fan.

The controller may be coupled to a light sensor to detect lighting conditions around the charger. The controller may further be operably coupled to room lighting. Upon receiving user preference data, for example, from the mobile user device or by user input, the controller may adjust the room lighting automatically or provide a suggestion to the user.

The controller may further be coupled to the cleaning element. The controller may activate the cleaning element to clean the aerosol-generating device, for example, automatically in response to detecting the presence of the aerosol-generating device in the cleaning port. Additionally, or alternatively, the controller may activate the cleaning element in response to a user action (for example, engaging an actuator associated with the cleaning port).

The controller may disconnect from the mobile user device. For example, the mobile user device may be disconnected in response to the determination that the battery identifier received using the charging interface does not match with the mobile user device connected using the communication interface. In response to a determination that the battery identifier does not match, the controller may search for a mobile user device that does match the battery coupled to the charging interface. Also, the mobile user device may be disconnected in response to the battery being uncoupled, or removed, from the charging interface. For example, once the user removes the battery from the charging interface, the controller may also disconnect the mobile user device.

The controller may detect a user action associated with the battery. For example, an actuator associated with the charging port that receives the battery may be engaged by the user. The engagement may indicate that the controller should establish a connection with the mobile user device, or may even indicate that the controller should disconnect the mobile user device associated with the battery.

The controller may generate a viewable element (for example, viewable on the screen of the graphical user interface associated with the charging interface) based on user data from the mobile user device. For example, the user data may include calendar data, and the viewable element displayed on the screen may be a reminder of the user's next appointment.

The controller may be capable of modulating a battery charging current for the battery based on the maximum battery charging time. The controller may be capable of charging the battery in a quick charge mode (more current for a particular battery) or a load balancing mode (for example, the charger is running on batteries and not plugged into an electrical outlet). A maximum battery charging time may be determined by the controller in response to one or more of calendar data, travel data, and user preference data. The controller may enter a quick charge mode of the battery in response to the user's calendar indicating an urgent appointment, that may be more urgent than the schedule of other users charging batteries.

Charger data may be sent to the mobile user device using the communication interface. Charger data may be any data related to the charger. Non-limiting examples of charger data include: a level of charge of the battery, a time before full charge of the battery, a warning that full charge of the battery is completed, a warning that the battery remains operatively coupled to the charging interface in response to the user having an upcoming event, a time since last cleaning of the aerosol-generating device at this charger, a geographic location of the charger, or a service suggestion (to clean, to quick charge, etc).

The geographic location of the charger may be used by the mobile user device, for example, to keep track of places the user has already charged the battery. The geographic location history may be useful as social data. For example, historic location data may be used in social functionality, for example, to match the user with other users who have or have not travelled to the same geographic locations. Geographic location data may be useful as user preference data. For example, the controller may adjust a threshold air quality based on the preference of the user, such as a local norm of air quality (for example, based on the air quality standard where the user lives), before turning on the air mover.

Additionally, or alternatively, the controller of the charger may be coupled to a wireless network (for example, Wi-Fi or cellular), which may or may not include the mobile user device. The controller may use the wireless network to send a message to the mobile user device, for example, related to charging the battery. The user may plug the battery into the charging interface. The controller may establish a connection with the mobile user device of the user and retrieve the mobile user device phone number or other communication identifier. The user may then leave the vicinity of the charger (for example, return to the office or go to a store or restroom) such that the user cannot see the graphical user interface of the charger, which may indicate the charging status of the battery. Once the charge is complete, the user may be notified by a message, such as a text message, e-mail, or application notice, to return and pick up the charged battery.

One or more of the controllers described herein may include a processor, such as a central processing unit (CPU), computer, logic array, or other device capable of directing data coming into or out of the charger. The controller may include one or more computing devices having memory, processing, and communication hardware. The functions of the controller may be performed by hardware and/or as computer instructions on a non-transient computer readable storage medium.

The processor of the controller may include any one or more of a microprocessor, a controller, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

The exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be clear that the controller functionality as described herein may be implemented in any manner known to one skilled in the art.

In addition to other components, the mobile user device may include a user interface. The user interface may include a touchscreen, which may display various elements such as a keyboard. The user interface may allow the user to input various information, such as user data, one or more battery identifiers, air mover control, or cleaning element control. The battery identifier entered may be stored on the mobile user device (for example, before or after connecting to the charger) or used for comparison with the battery identifier received using the charging interface of the charger. The user interface may also display various information, such as social data from the charger or messages from the charger. Non-limiting examples of messages from the charger include: status messages (for example, charging status of the battery), reminders (for example, appointment or cleaning reminders), or alerts (for example, a suggested cleaning of the aerosol-generating device based on cleaning data).

The charger and mobile user device may use any suitable wireless protocol to establish the connection. The charger and mobile user device may use a Bluetooth protocol to establish the connection. Various methods may be used to establish a connection over Bluetooth, for example, depending on the version of Bluetooth used.

When using Bluetooth 4.0 or other star-like networks (for example, which only allow one master and several slaves that run off the master's clock), the charger may act as a "slave" in the Bluetooth "master-slave" configuration. The charger may go into an advertise mode so as to be detected by nearby mobile user devices. The mobile user devices may act as a "master" for the charger acting as a slave. Once the mobile user device detects an advertising packet from the charger, the mobile user device can allow for a wireless Bluetooth connection between the charger and the mobile user device. After establishing the connection, the charger and the mobile user device may switch roles so that the charger is a master and the mobile user device is a slave.

When using Bluetooth 4.1 and higher or other dual-topology networks having multi-master properties (for example, which allow multiple masters as well as multiple slaves), the charger may establish connections to multiple mobile user devices, with some acting as slaves and some acting as masters.

Once a wireless connection has been established with a new nearby mobile user device, the charger may proceed to associate batteries and mobile user devices using the battery identifiers, at least for each of the batteries which has not yet been linked to a mobile user device by the charger. To do so, a specific application may be installed on the mobile user devices, which may register and store various information, such as one or more battery identifiers associated with the aerosol-generating device or user data (for example, a name or status).

The charger may read one or more battery identifiers transmitted from the mobile user device or send the battery identifier of the battery coupled to the charger to one or mobile user devices to check for matches. Preferably, the charger may receive one or more battery identifiers from the mobile user devices and performs the check on the controller, which may have advantages, for example, from a data security perspective.

The aerosol-generating device may be able to communicate with the mobile user device or the charger. For example, the aerosol-generating device may include a communication interface capable of establishing a Bluetooth or other wireless connection. The battery identifier may be received from the aerosol-generating device, which may have a controller configured to detect the battery identifier from the battery (for example, using power line communication). The battery identifier may be transmitted from the aerosol-generating device to the charger or may be transmitted to the mobile user device and then to the charger.

When a new battery or aerosol-generating device is coupled to the charger, the charger may retrieve the battery identifier from the coupled battery. The charger may then attempt to match the battery identifier to one connected mobile user device. If no match is determined, the charger may continue to establish connections with new mobile user devices until a match is found. If the charger finds a match for the battery identifier, the mobile user device may be added to the Bluetooth network, or piconet, of the charger. If a connected mobile user device does not match any of the battery identifiers, the mobile user device may be disconnected.

FIG. 1 is an illustration showing an environment 10, in which one or more users 12 may be in the vicinity of a charger 5. The environment 10 may be a public or social space, such as a transit station for trains, planes, or buses. The users 12 may each have an aerosol-generating device that may be charged by the charger 5 concurrently. The charger 5 may be in an open space or an enclosed space for the users to congregate around the charger. The charger 5 may facilitate social exchanges among the users 12 with a graphical user interface, a speaker, or mobile user devices connected to the charger.

Figure 2:
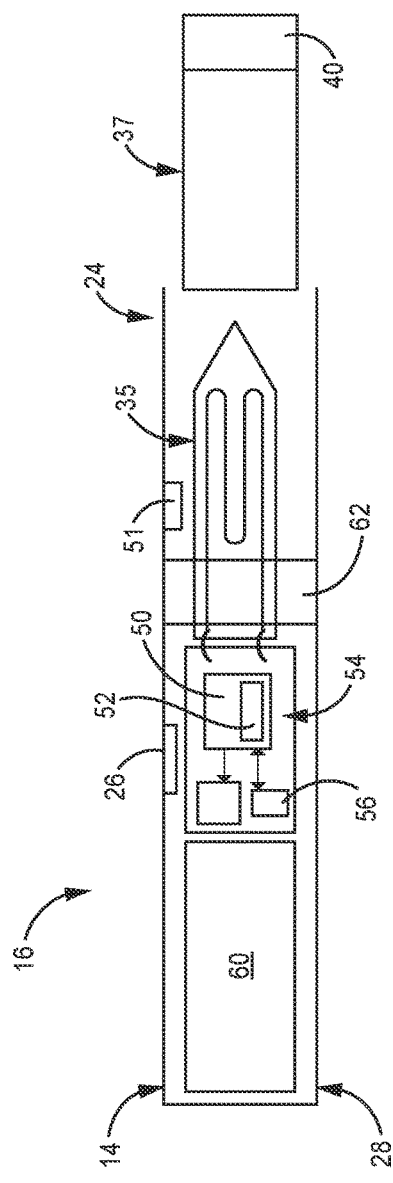

FIG. 2 is a schematic illustration showing an example of one aerosol-generating device 16. The device 16 may include a housing 14, a mouth portion 24, and a controller portion 28. A battery 60, or other portable power source, may be operatively coupled to one or more components to power other components of the aerosol-generating device 16. An actuator 26 may be disposed on the controller portion 28. The mouth portion 24 may include an aerosolizer 35 in the form of a heating blade. An aerosol-generating substrate 37 in the form of a heat stick may be inserted into the mouth portion 24 and onto the aerosolizer. A container of the aerosol-generating substrate 37 may include or may be coupled to a mouthpiece 40. The user may inhale on the mouthpiece 40 to register a user puff.

A thermal brake 62 may be disposed between at least a portion of the aerosolizer 35 and a control circuit 54. The aerosolizer 35 may extend through the thermal brake 62. The control circuit 54 may include components to enable various functionality of the device 16, which may be sensitive to heat produced by the aerosolizer 35.

The control circuit 54 may include a controller 50, which may be a microcontroller or microprocessor, and a communications interface 52. The controller 50 may be operatively coupled to the aerosolizer 35 and the communications interface 52. The communications interface 52 may be integrated into the controller 50. The communications interface 52 may be capable of communicating using a Bluetooth protocol. A puff sensor 51 may be operatively coupled to the control circuit 54 and positioned to detect an inhalation of the user on the mouth portion 24. The control circuit 54 may include a memory 56 operatively coupled to the controller 50. The memory 56 may be used to store data.

Although aerosol-generating device 16 is shown, other types of aerosol-generating devices having a battery 60 are also contemplated, for example with different types of aerosolizers and other components.

Figure 3:
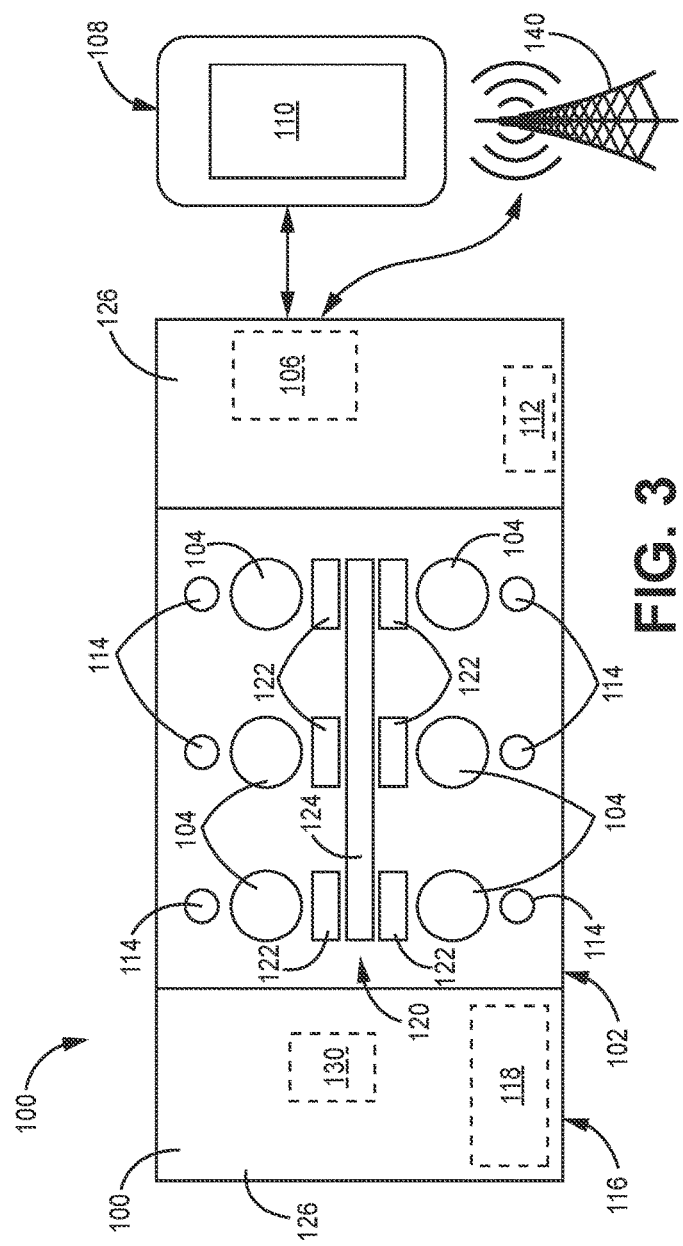

FIG. 3 is a schematic illustration of one example of a charger 100 for an aerosol-generating device, such as aerosol-generating device 16. The charger 100 may include a housing 116, which may at least partially contain one or more components of the charger 100. The charger 100 may include a charging interface 102 operatively couplable to the battery 60 of the aerosol-generating device 16 (FIG. 2). The charging interface 102 may include one or more charging ports 104, one or more cleaning ports 114, and a graphical user interface 120. The charging ports 104 and the cleaning ports 114 may be disposed in the housing 116 or formed therein to create receptacles for receiving components of the aerosol-generating device 16. The graphical user interface 120 may include one or more specific screens 122 and one or more general screens 124. The graphical user interface 120 may include one or more touchscreens associated with the screens 122, 124 or one or more associated actuators that are part of the charging interface 102 to receive user input.

The battery 60 (FIG. 2) may be at least partially inserted or coupled to one of the charging ports 104. Another component of the aerosol-generating device 16 (FIG. 2), such as the mouth portion 24 having the aerosolizer 35 (FIG. 2), may be coupled to one of the cleaning ports 114. When the battery 60 is coupled, the specific screen 122 associated with the charging port 104 may display information, such as the charging status of the battery or the user's name. The general screen 124 may be used to display information to multiple users charging their batteries in the one or more charging ports 104. The charging ports 104 and cleaning ports 114 may, generally, be arranged around the general screen 124. Each charging port 104 may be proximate or adjacent to an associated cleaning port 114 or an associated specific screen 122.

The charger 100 may include a communication interface 106 to communicate with a mobile user device 108, at least while the battery 60 (FIG. 2) is coupled to the charging interface 102. Various information and data may be communicated between the charger 100 and the mobile user device 108, which may facilitate convenient charging or social exchanges with other users of the charger. The mobile user device 108 may include a screen 110, which may display information for the user related to user data or charging data and which may include a touchscreen to receive user input. The communication interface 106 may also be capable of communicating with a wireless network 140, for example, to send messages to the mobile user device 108, which may be connected to the same wireless network.

The charger 100 may include a controller 130 operatively coupled to the charging interface 102 and the communication interface 106 to provide various functionality of the charger 100. The controller 130 may also be operatively coupled to a locking component 118 (for example, a lockable compartment) to facilitate locking and unlocking in response to user input, for example, through the mobile user device 108.

The charger 100 may include an air sensor 112. The air sensor 112 may be used to detect one or more contaminants in the vicinity of the charger 100.

The charger 100 may include one or more speakers 126 to provide sound to the one or more users in the vicinity of the charger. For example, music may be streamed from one of the mobile user devices through the speakers 126.

Figure 4:
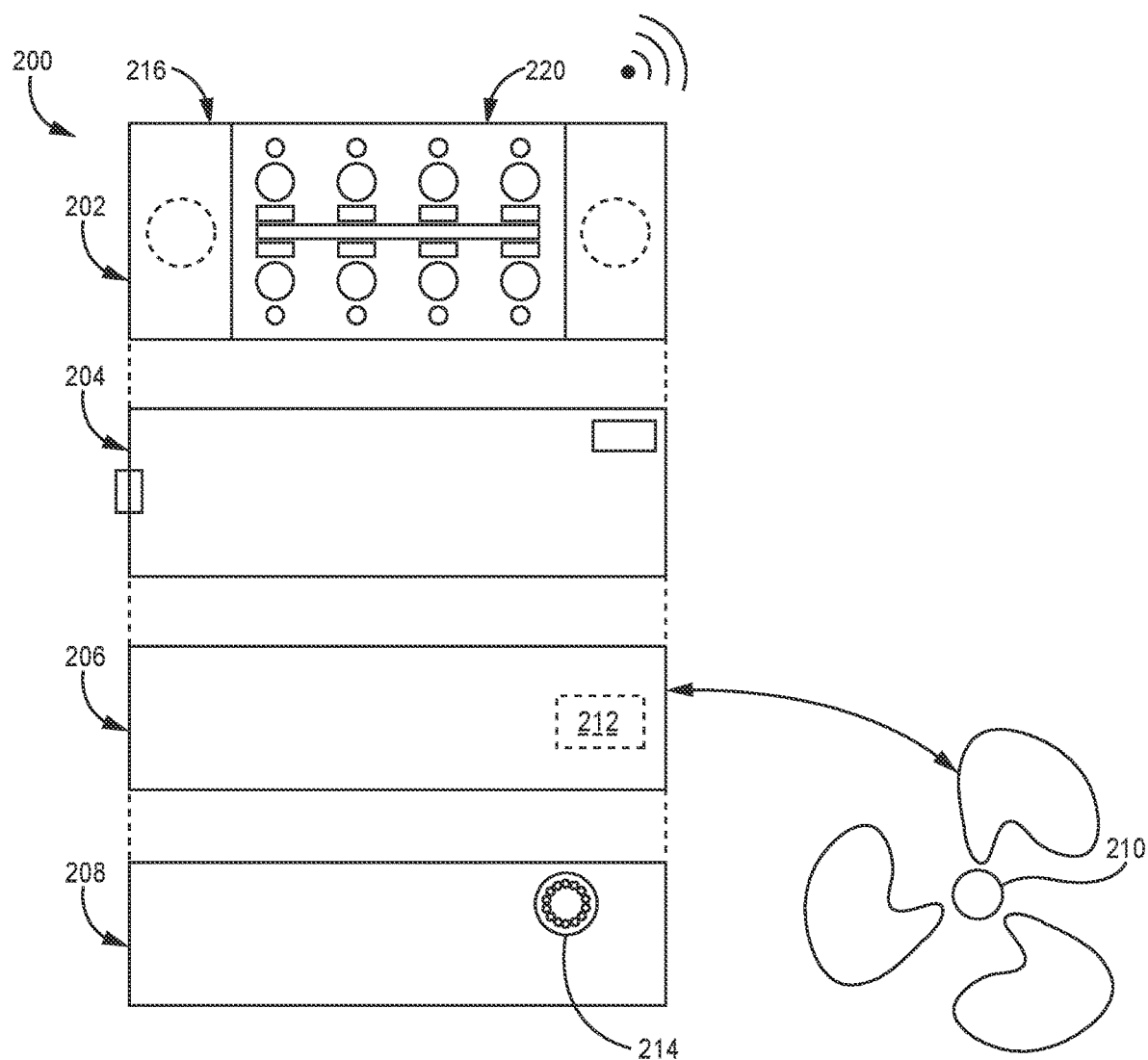

FIG. 4 is a schematic illustration of another example of a charger 200. Charger 200 may be similar to charger 100 (FIG. 3) and may include many of the same components, except charger 200 may be modular. In other words, the housing 216 of the charger 200 may have one or more removably couplable modules, each with various functionality. As illustrated, the charger 200 may include a first module 202, a second module 204, a third module 206, and a fourth module 208. Each of the modules 202, 204, 206, 208 may be operatively coupled to form a stack. The first module 202 may include a charging interface 220. The second module 204 may provide a power supply, which may include a battery or a connection to an external power source (for example, an electrical outlet). The third module 206 may include an air quality sensor 212. The third module 206 may also be operatively couplable to an air mover 210 to control the air mover (for example, using a wired or wireless connection). The fourth module 208 may include one or more cleaning ports 214, each of which may include, for example, a rotating brush to clean a heating blade.

Figure 5:
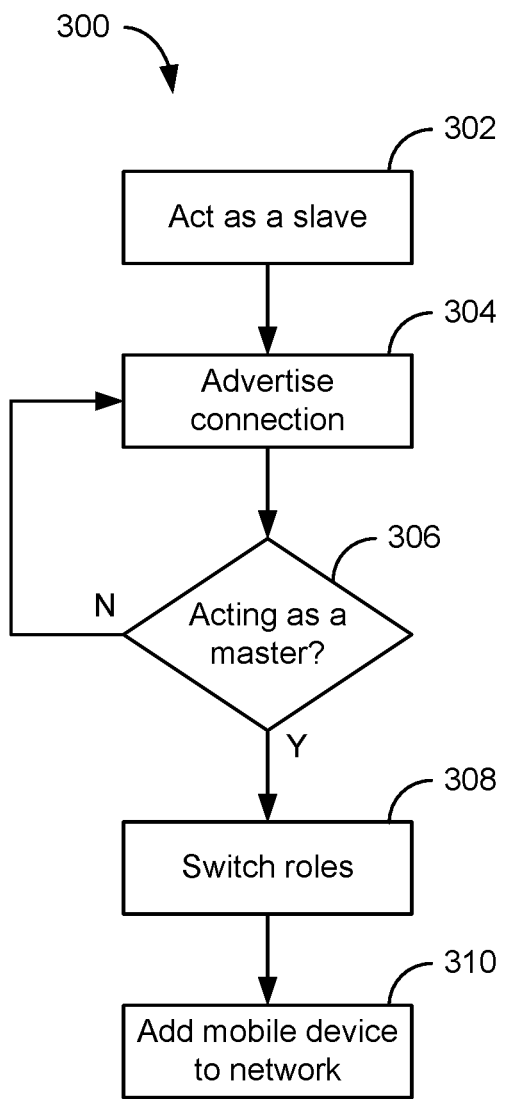

FIG. 5 is a flowchart illustrating one example of a method 300 to establish a connection between a charger to a mobile user device using a wireless protocol, particularly a Bluetooth protocol. In process 302, the charger may act as a slave. In process 304, the charger may advertise the connection to potential mobile user devices in the vicinity. In process 306, if a mobile user device acting as a master connects to the charger, then the method 300 may continue to process 308. If a mobile user device has not connected, then the process may return to process 304. In process 308, after the mobile user device is connected, the mobile user device and the charger may switch roles. In other words, the charger may act as a master, and the mobile user device may act as a slave. The method 300 may end with process 310, in which the mobile user device may be added to the piconet, or Bluetooth network, of the charger.

Figure 6:
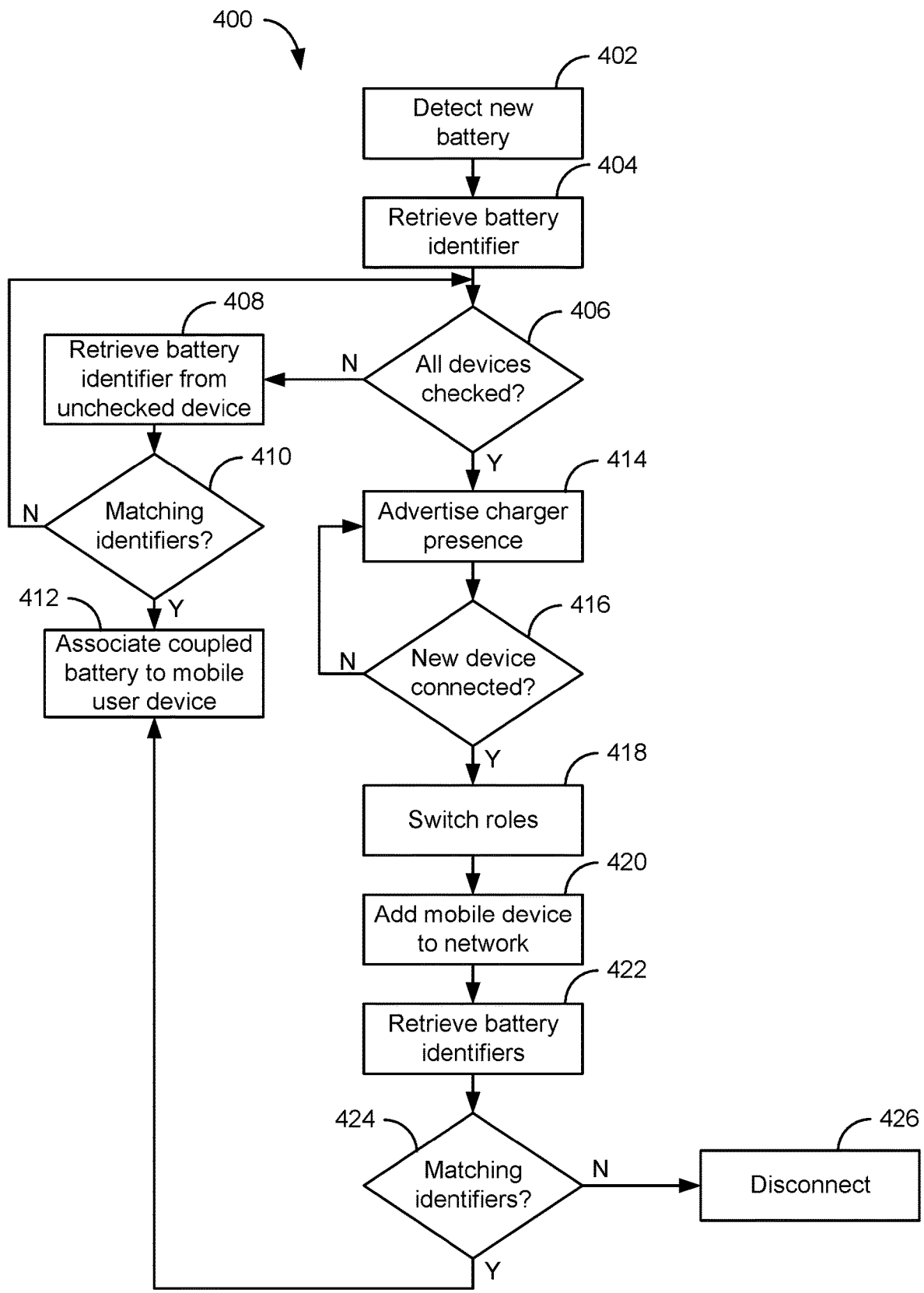

FIG. 6 is a flowchart illustrating another example of a method 400 to establish a connection between a charger to a mobile user device using a wireless protocol, particularly a Bluetooth protocol. In process 402, the charger may detect that a new battery has been coupled to the charging interface. In process 404, a battery identifier may be retrieved from the battery. In process 406, the charger may determine whether all connected mobile user devices have been checked for the battery identifier retrieved from the battery. If not all mobile user devices have been checked, the method 400 may continue onto process 408 to retrieve a battery identifier from an unchecked mobile user device (for example, from an application running on the mobile user device). In process 410, the charger may determine whether the battery identifier from the mobile user device matches the battery identifier retrieved from the coupled battery. If not, the method 400 may return to process 406 to continue checking mobile user devices for a matching identifier. If the battery identifiers match in process 410, then the method 400 may continue to process 412 to associate the coupled battery to the mobile user device.

If all connected mobile user devices have been checked in process 406, the method 400 may continue onto process 414 to advertise the presence of the charger to other mobile user devices in the vicinity. In process 416, the charger may determine whether a new mobile user device has connected. If not, then the method 400 may repeat process 414. If a new mobile user device has been connected to the charger (for example, the charger connects as a slave to a master mobile user device), the method 400 may continue on to process 418 to switch the roles of the mobile user device and the charger. In other words, the charger may act as a master, and the mobile user device may act as a slave. The mobile user device may be added to the piconet of the charger in process 420.

The charger may retrieve one or more battery identifiers from the mobile user device in process 422. In particular, an application running on the mobile user device may provide the battery identifier to the charger. The charger may then determine whether the battery identifier retrieved from the coupled battery matches the battery identifier received from the mobile user device in process 424. If so, then the method 400 may proceed to process 412 to associate the coupled battery to the mobile user device. If the battery identifiers do not match, then the charger may disconnect from the new mobile user device in process 426. The method 300 may then proceed to process 414 to continue advertising for potential mobile user devices to connect.

The specific embodiments described above are intended to illustrate the invention. However, other embodiments may be made without departing from the scope of the invention as defined in the claims, and it is to be understood that the specific embodiments described above are not intended to be limiting.

As used herein, the singular forms "a," "an," and "the" encompass embodiments having plural referents, unless the content clearly dictates otherwise.

As used herein, "or" is generally employed in its sense including "and/or" unless the content clearly dictates otherwise. The term "and/or" means one or all of the listed elements or a combination of any two or more of the listed elements.

As used herein, "have," "having," "include," "including," "comprise," "comprising" or the like are used in their open-ended sense, and generally mean "including, but not limited to". It will be understood that "consisting essentially of," "consisting of," and the like are subsumed in "comprising," and the like.

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a mobile user device may be operatively coupled to a cellular network transmit data to or receive data therefrom).

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

The invention claimed is:

1. A charger for an aerosol-generating device, the charger comprising:
a charging interface operatively couplable to a battery for the aerosol-generating device;
an air sensor configured to detect a contaminant; and
a controller operatively coupled to the charging interface and the air sensor, the controller configured to:
detect the contaminant using the air sensor; and
activate an air mover in response to detection of the contaminant.

2. The charger of claim 1, wherein the controller is operatively coupled to a communication interface to communicate with a mobile user device at least while the battery is coupled to the charging interface, the controller further configured to:
establish a connection with the mobile user device using the communication interface, the connection configured to communicate user data; and
associate a battery identifier with the mobile user device after establishing the connection with the mobile user device.

3. The charger of claim 2, wherein the user data comprises one or more of: a username associated with the mobile user device, a mobile user device identifier, a maximum battery charging time, one or more battery identifiers associated with the mobile user device, cleaning data, calendar data, travel data, multimedia data, user preference data, and social data.

4. The charger of claim 2, wherein the controller is further configured to establish the connection using a Bluetooth protocol.

5. The charger of claim 2, wherein the controller is further configured to associate the battery identifier with the mobile user device based on user data communicated between the communication interface and the mobile user device.

6. The charger of claim 2, wherein the controller is further configured to receive the battery identifier using the charging interface in response to coupling the battery to the charging interface.

7. The charger of claim 2, wherein the controller is further configured to:
send the battery identifier to the mobile user device using the communication interface; and
receive a determination from the mobile user device that the battery identifier matches the mobile user device after sending the battery identifier to the mobile user device.

8. The charger of claim 7, wherein the controller is further configured to send the battery identifier to any mobile user device connected to the controller to associate the battery with a particular mobile user device.

9. The charger of claim 2, wherein the controller is further configured to:
receive one or more battery identifiers associated with the mobile user device from the mobile user device; and
determine whether the battery identifier matches one of the received one or more battery identifiers.

10. The charger of claim 7, wherein the controller is further configured to disconnect from the mobile user device in response to the determination that the battery identifier does not match.

11. The charger of claim 7, wherein the controller is further configured to search for another mobile user device in response to a determination that the battery identifier does not match.

12. The charger of claim 2, wherein the charging interface comprises a screen and the controller is further configured to:
generate a viewable element based on user data from the mobile user device; and
display the viewable element on the screen.

13. The charger of claim 2, wherein the controller is operatively couplable to a wireless network to send a message to the mobile user device related to charging the battery.

14. The charger of claim 2, wherein the controller is further configured to:
determine social data based on the user data from the mobile user device; and
share the social data with other mobile user devices having an established connection using the communication interface.

15. The charger of claim 1, wherein the charger comprises a housing comprising the charging interface, the housing further comprising a locking component assignable to one or more users.

16. The charger of claim 7, wherein the controller is further configured to:
receive one or more battery identifiers associated with the mobile user device from the mobile user device; and
determine whether the battery identifier matches one of the received one or more battery identifiers.

17. The charger of claim 7, wherein the charging interface comprises a screen and the controller is further configured to:
generate a viewable element based on user data from the mobile user device; and
display the viewable element on the screen.

18. The charger of claim 9, wherein the charging interface comprises a screen and the controller is further configured to:
generate a viewable element based on user data from the mobile user device; and
display the viewable element on the screen.

19. The charger of claim 7, wherein the controller is further configured to:
determine social data based on the user data from the mobile user device; and
share the social data with other mobile user devices having an established connection using the communication interface.

20. The charger of claim 9, wherein the controller is further configured to:
determine social data based on the user data from the mobile user device; and
share the social data with other mobile user devices having an established connection using the communication interface.

* * * * *